United States Patent
Taki (10) Patent No.: US 7,864,451 B2
(45) Date of Patent: Jan. 4, 2011

(54) IMAGING LENS AND IMAGE PICKUP APPARATUS INCLUDING THE SAME

(75) Inventor: Yoshiyuki Taki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/639,805

(22) Filed: Dec. 16, 2009

(65) Prior Publication Data

US 2010/0157445 A1  Jun. 24, 2010

(30) Foreign Application Priority Data

Dec. 19, 2008  (JP)  ............................. 2008-324167

(51) Int. Cl.
*G02B 13/02* (2006.01)
*G02B 27/64* (2006.01)

(52) U.S. Cl. ...................................... 359/745; 359/557

(58) Field of Classification Search ................. 359/554, 359/557, 745–748
See application file for complete search history.

(56) References Cited

U.S. PATENT DOCUMENTS 7,116,489 B2 * 10/2006 Ohtake ....................... 359/687
2008/0094709 A1 * 4/2008 Iwasawa ...................... 359/557

FOREIGN PATENT DOCUMENTS

JP  2000-214380 A  8/2000
JP  2003-329919 A  11/2003

* cited by examiner

*Primary Examiner*—Scott J Sugarman
(74) *Attorney, Agent, or Firm*—Canon USA Inc IP Division

(57) ABSTRACT

An imaging lens includes first to fourth lens units in order from the object side to the image side. The first, third, and fourth lens units have a positive refractive power. The second and fifth lens units have a negative refractive power. During focusing from an object at infinity to a close object, the first, third, and fifth lens units do not move, and the second and fourth lens units respectively move toward the image side and the object side. The fifth lens unit includes a fifth-a lens unit having a negative refractive power which moves in a direction having a component perpendicular to an optical axis to shift a image position, and a fifth-b lens unit having a positive refractive power. Focal lengths of the third lens unit, the entire system of the imaging lens, the fifth-a lens unit, and the fifth-b lens unit are adequately set.

5 Claims, 13 Drawing Sheets

FIG. 10

IMAGING LENS AND IMAGE PICKUP APPARATUS INCLUDING THE SAME

BACKGROUND OF THE INVENTION

1. Field of the Invention

The present invention relates to imaging lenses suitable for use in photographic cameras, video cameras, electronic still cameras, etc., and more particularly, to an imaging lens capable of performing a close-distance imaging (macro imaging) operation in which an imaging magnification is about 1 and optically correcting image blur caused by hand movements or the like.

2. Description of the Related Art

A macro lens is an example of an imaging lens which is mainly used for close-distance imaging operation in which an imaging magnification is about 1. The macro lens is capable of taking an image of an object in the distance range from infinity to a close distance at which the imaging magnification is about 1, and is designed such that high optical performance is provided in the process of taking, in particular, an image of a close object (macro imaging operation).

In an imaging lens including the macro lens, variations in aberrations caused during focusing generally increase and the optical performance is degraded as the imaging magnification increases. To prevent this, the imaging lens may use a floating method in which the aberrations are corrected by moving a plurality of lens units in a process of focusing on a close object.

In the case where focusing is performed by moving a first lens unit, which is closest to the object side in the imaging lens, toward the object side, a working distance, which is a distance between the object and a lens surface closest to the object side in the first lens unit, decreases. Accordingly, an inner-focus macro lens in which focusing is performed by moving a lens unit close to the image side without moving the first lens unit has been proposed (Japanese Patent Laid-Open No. 2003-329919).

In addition, a macro lens including a part which can be moved in a direction having a component that is perpendicular to an optical axis so as to correct the image blur by shifting the image position has been proposed (Japanese Patent Laid-Open No. 2000-214380).

The close-distance imaging operation is generally performed while the size of the aperture in the aperture stop is reduced (the F-number is increased) to ensure the depth of field. However, if the size of the aperture in the aperture stop is reduced, the shutter speed is also reduced and motion blur easily occurs in the imaging operation. In addition, the influence of hand movements on the obtained image increases as the object distance decreases.

SUMMARY OF THE INVENTION

An imaging lens according to the present invention includes a first lens unit having a positive refractive power; a second lens unit having a negative refractive power; a third lens unit having a positive refractive power; a fourth lens unit having a positive refractive power; and a fifth lens unit having a negative refractive power. The first lens unit, the second lens unit, the third lens unit, the fourth lens unit, and the fifth lens unit are arranged in order from the object side to the image side. During focusing from an object at infinity to a close object, the first lens unit, the third lens unit, and the fifth lens unit do not move, the second lens unit moves toward the image side, and the fourth lens unit moves toward the object side. The fifth lens unit includes a fifth-a lens unit having a negative refractive power and a fifth-b lens unit having a positive refractive power in order from the object side to the image side, the fifth-a lens unit moving in a direction having a component perpendicular to an optical axis to shift a image position. When f3 is a focal length of the third lens unit, f is a focal length of the entire system of the imaging lens, f5a is a focal length of the fifth-a lens unit, and f5b is a focal length of the fifth-b lens unit, the following conditions are satisfied:

$$1.5 < f3/f < 3.0$$

$$0.35 < |f5a/f5b| < 0.60$$

According to the present invention, an imaging lens is provided with which a macro imaging operation can be easily performed, which is capable of correcting image blur caused by hand movements, and which provides good optical performance in both of the state in which a lens unit is not decentered (basic state) and the state in which the lens unit is decentered (vibration reducing state).

Further features of the present invention will become apparent from the following description of exemplary embodiments with reference to the attached drawings.

DESCRIPTION OF THE EMBODIMENTS

Imaging lenses according to embodiments of the present invention and an image pickup apparatus including an imaging lens according to any one of the embodiments will be described in detail with reference to the drawings.

Each of the imaging lenses according to the embodiments of the present invention includes a first lens unit having a positive refractive power, a second lens unit having a negative refractive power, a third lens unit having a positive refractive power, a fourth lens unit having a positive refractive power, and a fifth lens unit having a negative refractive power in order from the object side to the image side.

Figure 1A:
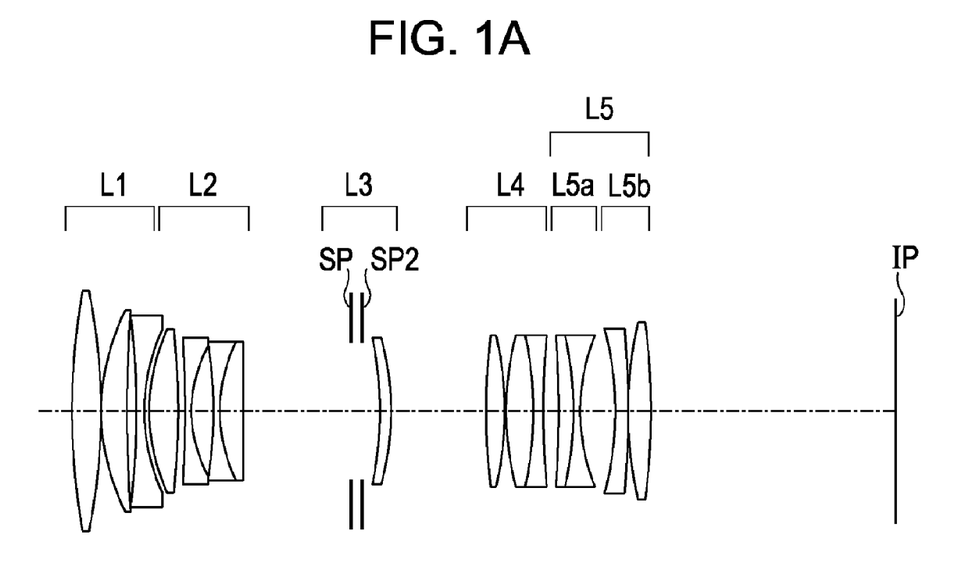
FIGS. 1A and 1B are sectional views of an imaging lens according to a first embodiment of the present invention.
Figure 1B:
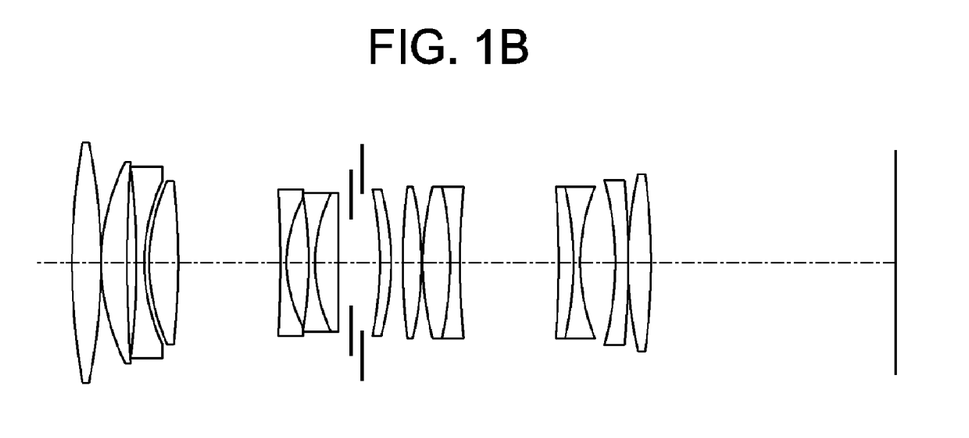

FIGS. 1A and 1B are sectional views of an imaging lens according to a first embodiment of the present invention, and respectively show the state in which the object distance is infinity and the state in which the imaging magnification is 1.

Figure 2A:
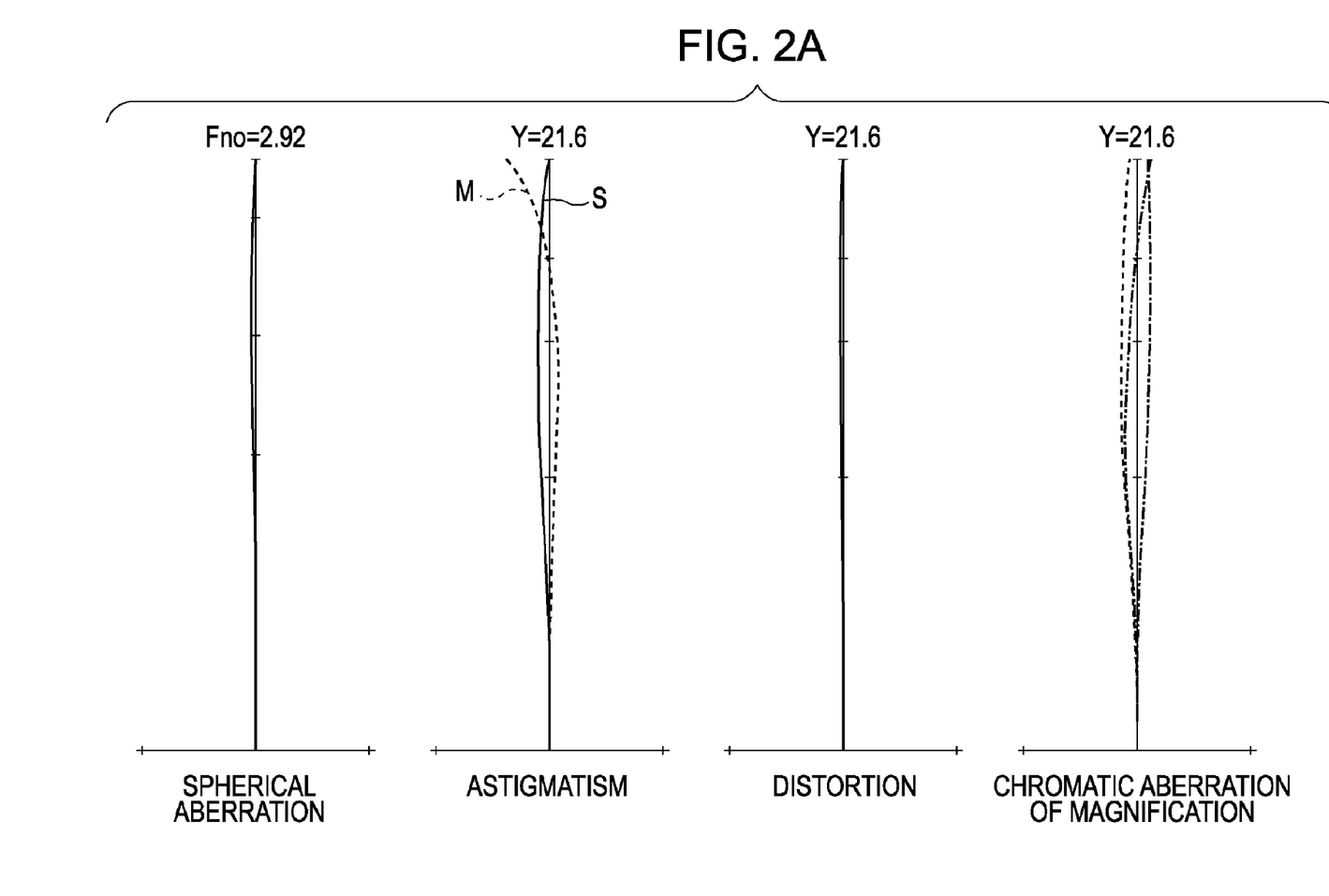
FIGS. 2A and 2B are aberration diagrams of the imaging lens according to the first embodiment of the present invention.
Figure 2B:
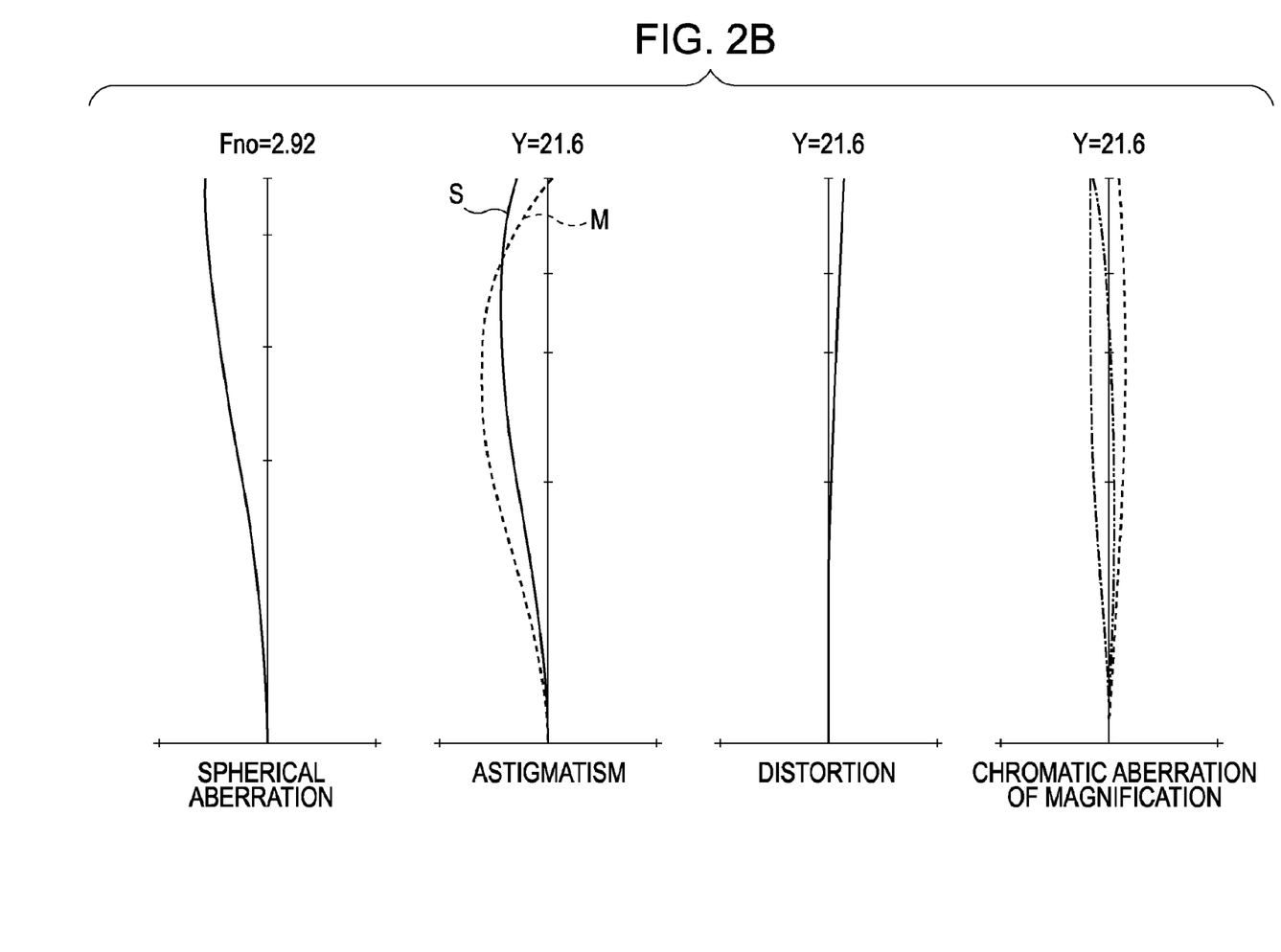

FIGS. 2A and 2B are aberration diagrams of the imaging lens according to the first embodiment of the present invention, and respectively show the state in which the object distance is infinity and the state in which the imaging magnification is 1.

Figure 3A:
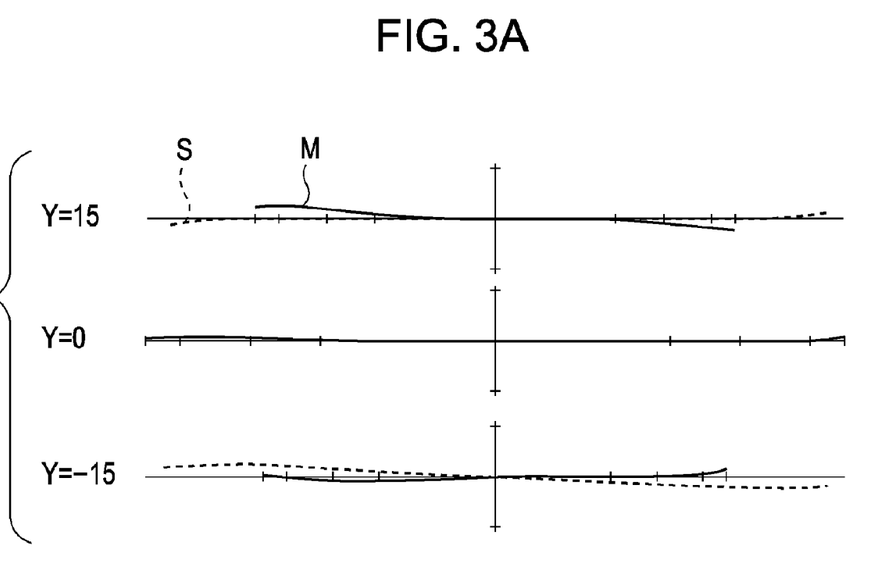
FIGS. 3A and 3B are aberration diagrams obtained when a image position is shifted by an amount corresponding to 0.3° in terms of field angle in the imaging lens according to the first embodiment of the present invention.
Figure 3B:
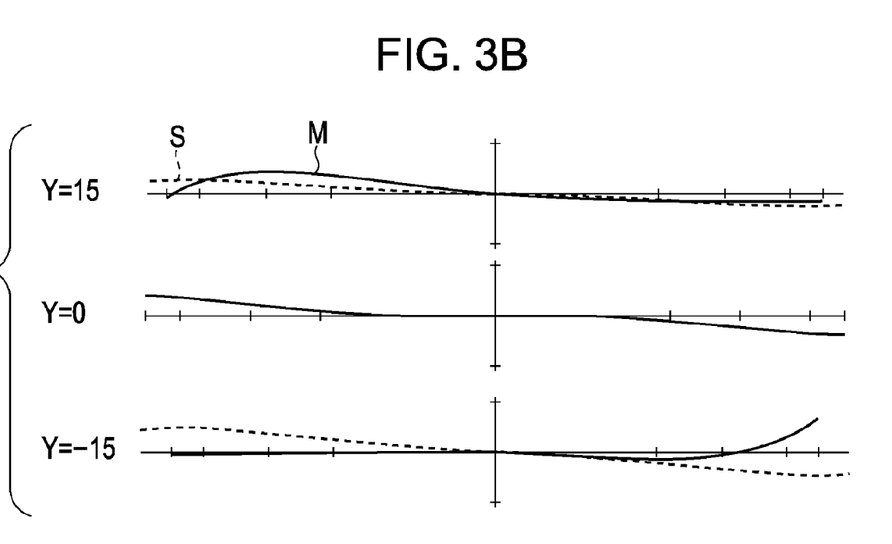

FIGS. 3A and 3B are aberration diagrams obtained when a image position is shifted by an amount corresponding to 0.3° in terms of field angle in the imaging lens according to the first embodiment of the present invention, and respectively show the state in which the object distance is infinity and the state in which the imaging magnification is 1.

Figure 4A:
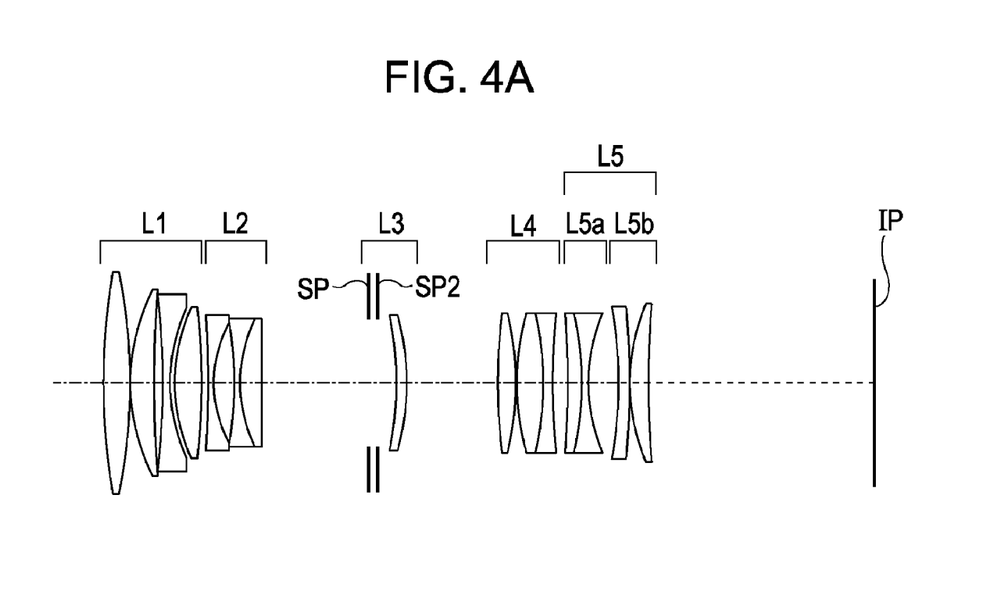
FIGS. 4A and 4B are sectional views of an imaging lens according to a second embodiment of the present invention.
Figure 4B:
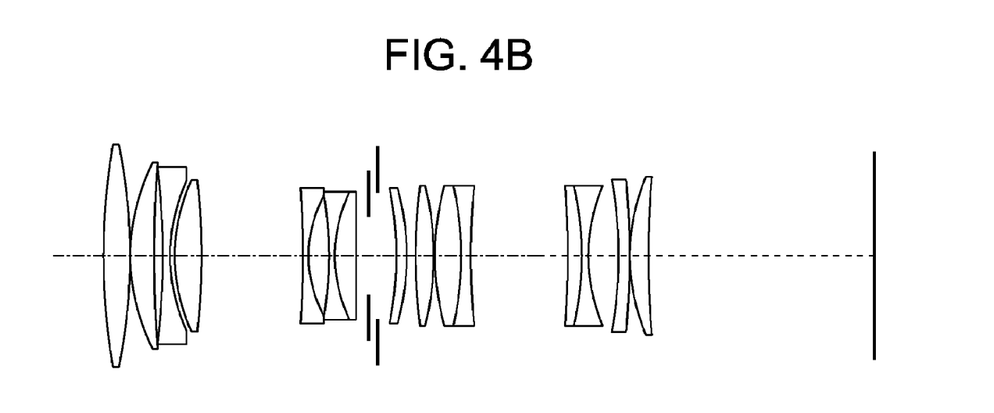

FIGS. 4A and 4B are sectional views of an imaging lens according to a second embodiment of the present invention, and respectively show the state in which the object distance is infinity and the state in which the imaging magnification is 1.

Figure 5A:
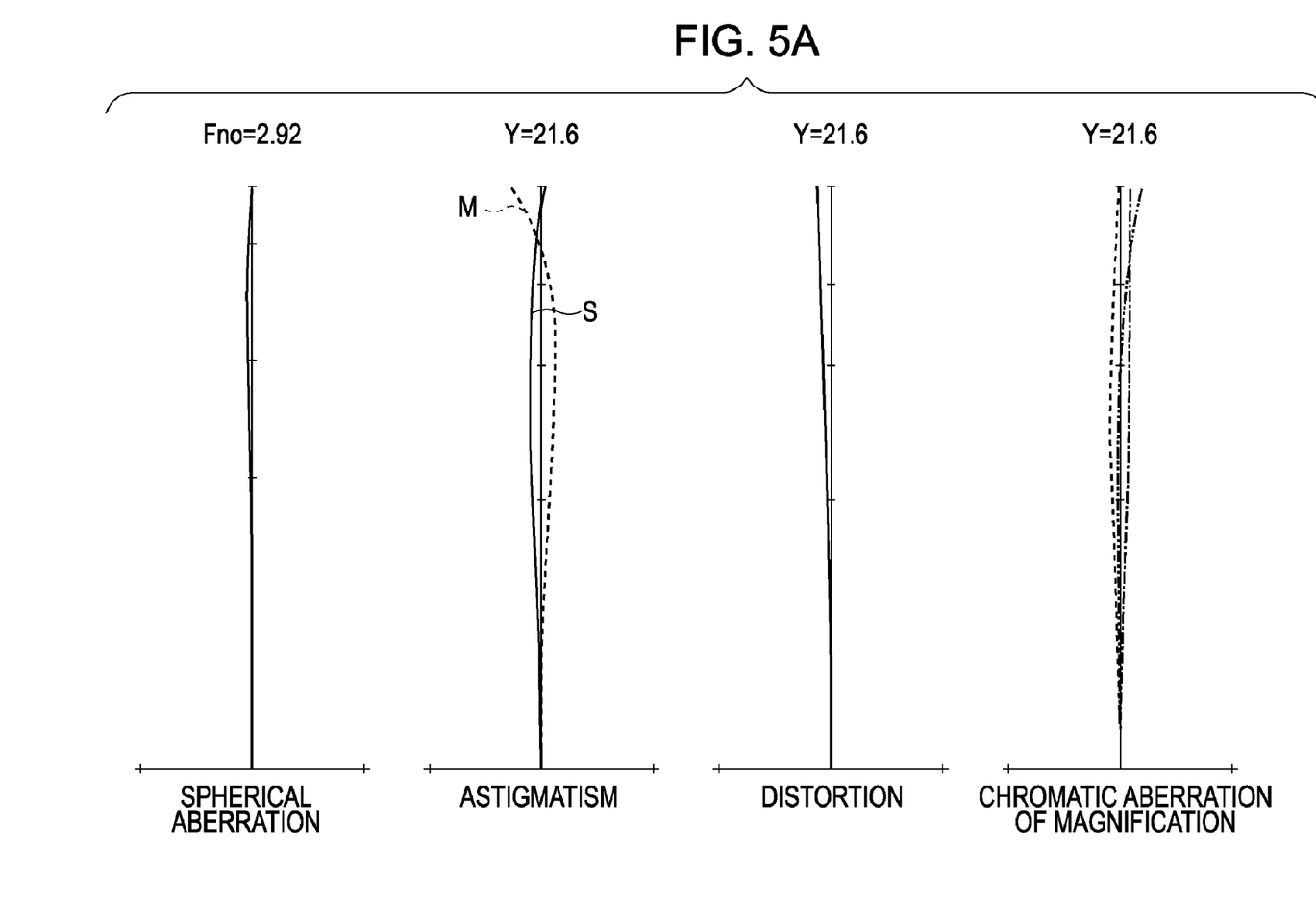
FIGS. 5A and 5B are aberration diagrams of the imaging lens according to the second embodiment of the present invention.
Figure 5B:
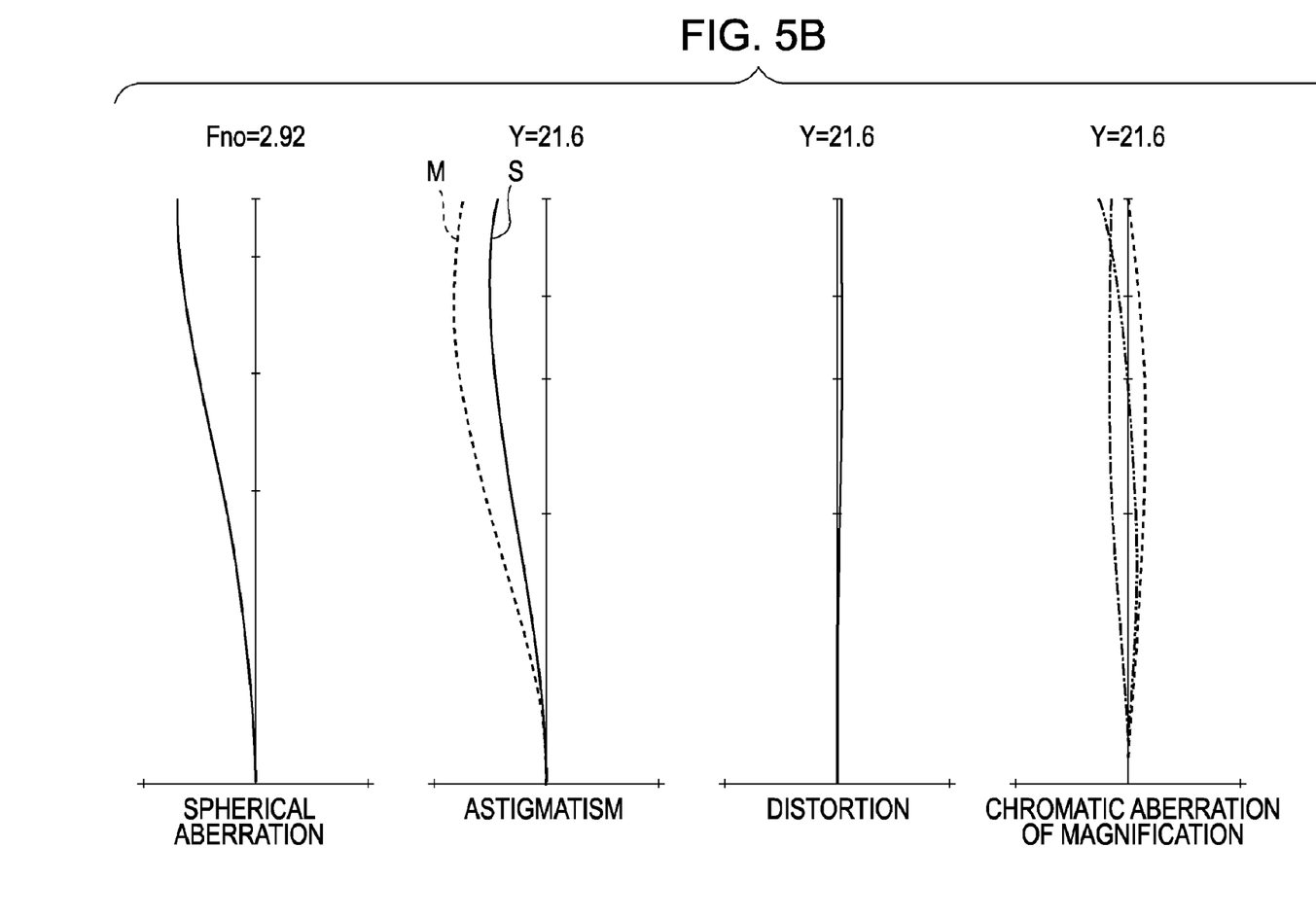

FIGS. 5A and 5B are aberration diagrams of the imaging lens according to the second embodiment of the present invention, and respectively show the state in which the object distance is infinity and the state in which the imaging magnification is 1.

Figure 6A:
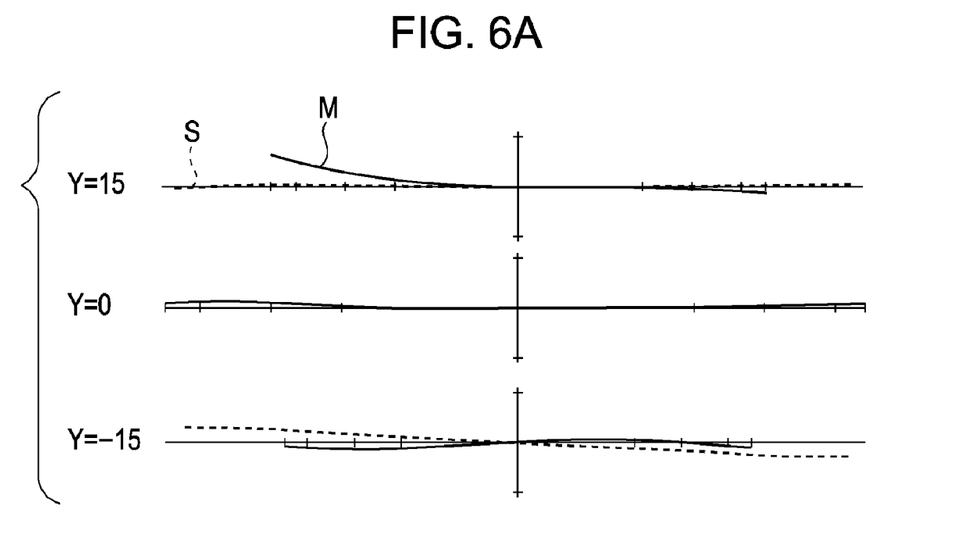
FIGS. 6A and 6B are aberration diagrams obtained when a image position is shifted by an amount corresponding to 0.3° in terms of field angle in the imaging lens according to the second embodiment of the present invention.
Figure 6B:
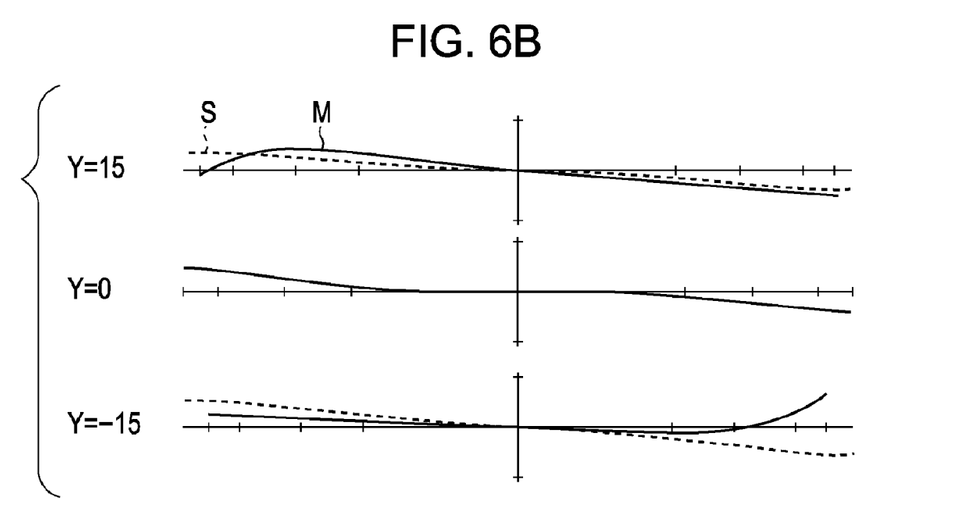

FIGS. 6A and 6B are aberration diagrams obtained when a image position is shifted by an amount corresponding to 0.3° in terms of field angle in the imaging lens according to the second embodiment of the present invention, and respectively show the state in which the object distance is infinity and the state in which the imaging magnification is 1.

Figure 7A:
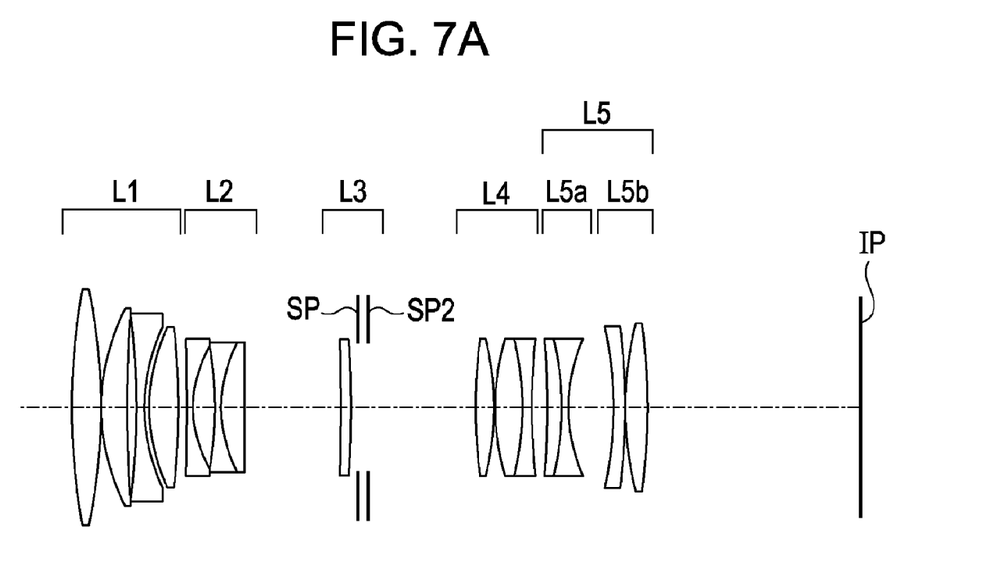
FIGS. 7A and 7B are sectional views of an imaging lens according to a third embodiment of the present invention.
Figure 7B:
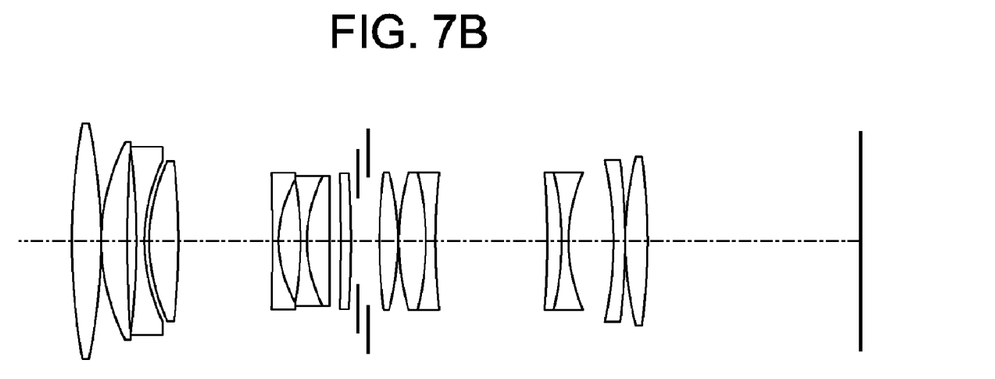

FIGS. 7A and 7B are sectional views of an imaging lens according to a third embodiment of the present invention, and respectively show the state in which the object distance is infinity and the state in which the imaging magnification is 1.

Figure 8A:
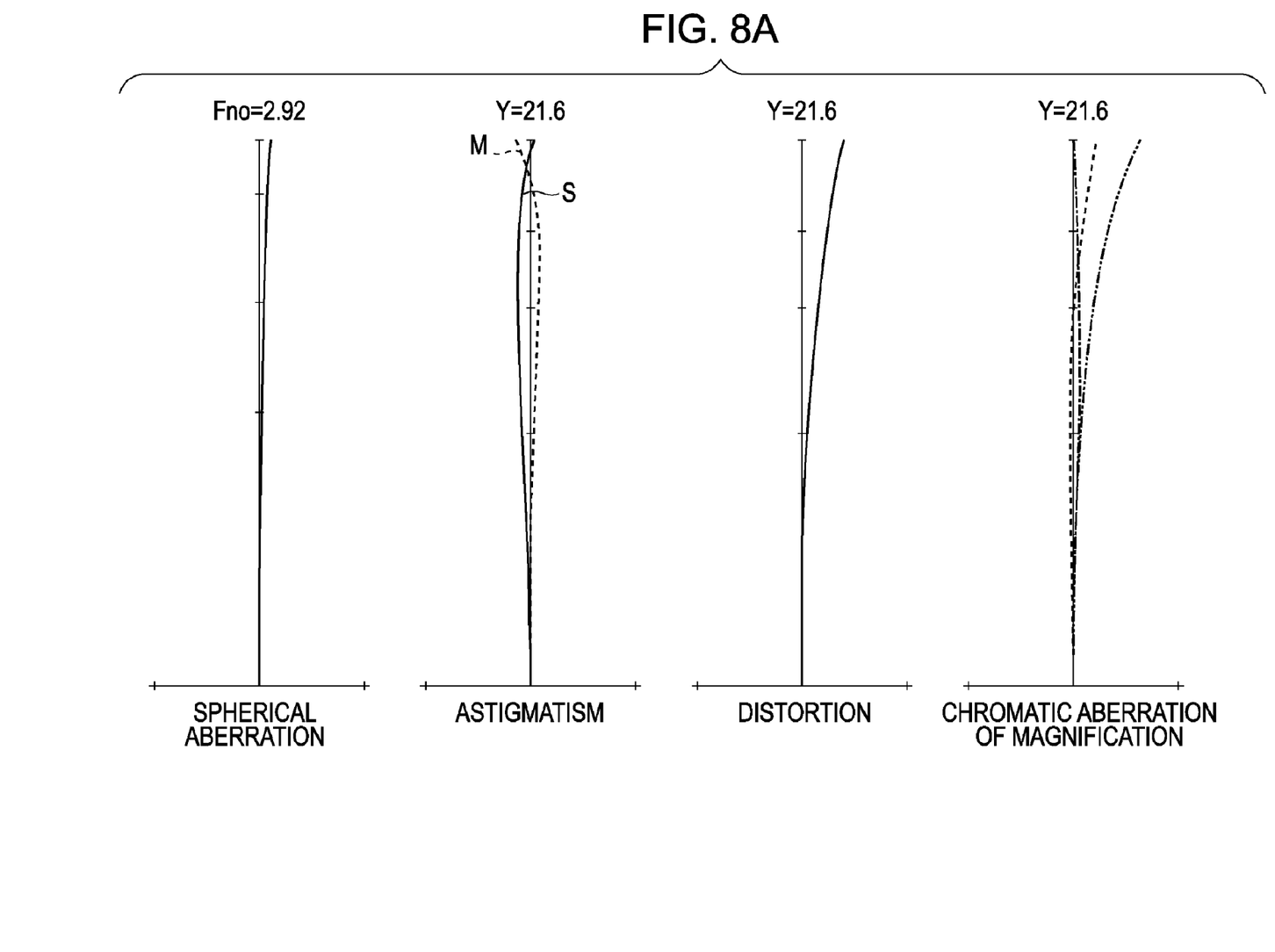
FIGS. 8A and 8B are aberration diagrams of the imaging lens according to the third embodiment of the present invention.
Figure 8B:
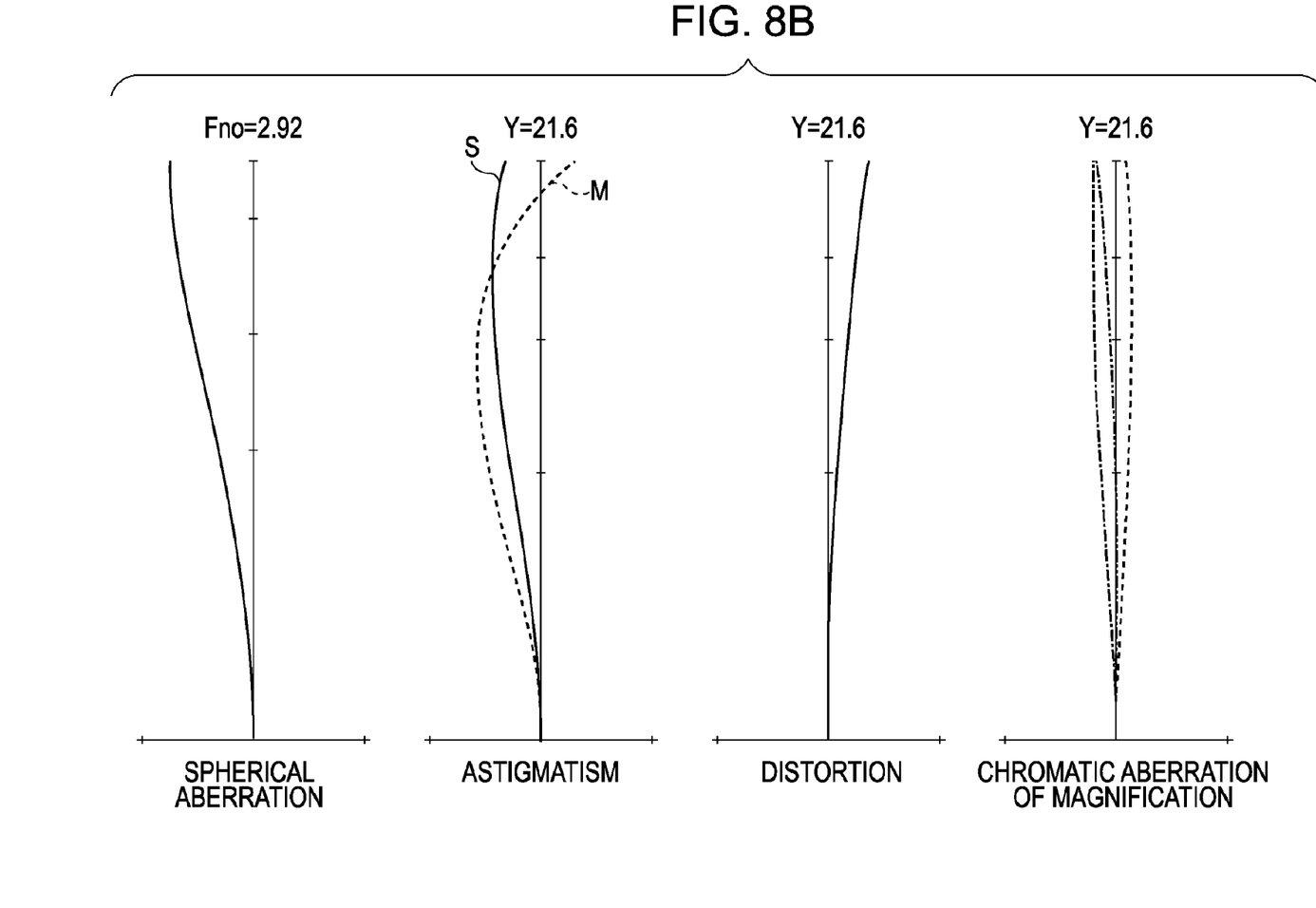

FIGS. 8A and 8B are aberration diagrams of the imaging lens according to the third embodiment of the present invention, and respectively show the state in which the object distance is infinity and the state in which the imaging magnification is 1.

Figure 9A:
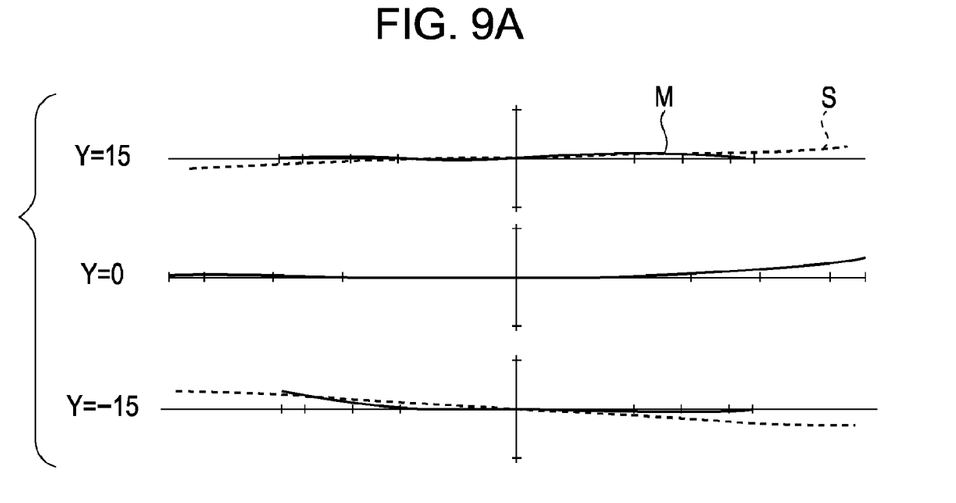
FIGS. 9A and 9B are aberration diagrams obtained when a image position is shifted by an amount corresponding to 0.3° in terms of field angle in the imaging lens according to the third embodiment of the present invention.
Figure 9B:
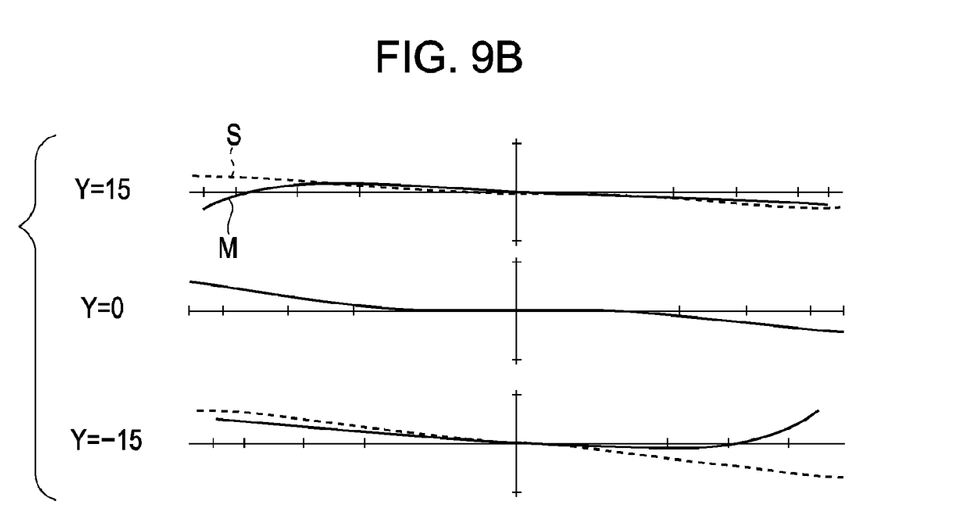

FIGS. 9A and 9B are aberration diagrams obtained when a image position is shifted by an amount corresponding to 0.3° in terms of field angle in the imaging lens according to the third embodiment of the present invention, and respectively show the state in which the object distance is infinity and the state in which the imaging magnification is 1.

In each embodiment, the imaging lens is capable of performing an operation of taking an image of a close object (macro imaging operation) in which an imaging magnification is about 1.

In each sectional view, the left side shows the object side (front) and the right side shows the image side (rear).

Referring to the sectional views shown in FIGS. 1A, 1B, 4A, 4B, 7A, and 7B, each imaging lens includes a first lens unit L1 having a positive refractive power, a second lens unit L2 having a negative refractive power, a third lens unit L3 having a positive refractive power, a fourth lens unit L4 having a positive refractive power, and a fifth lens unit L5 having a negative refractive power.

During focusing from an object at infinity to a close object, the first lens unit, the third lens unit, and the fifth lens unit do not move, the second lens unit moves toward the image side, and the fourth lens unit moves toward the object side.

A stop (main aperture stop) SP and a sub-stop (sub-aperture stop) SP2 are included in the third lens unit L3.

IP denotes an image plane. In the case where the imaging lens is used in a digital still camera or a video camera, an image pickup plane of a solid-state image pickup element (photoelectric conversion element), such as a CCD sensor or a CMOS sensor, is positioned at the image plane IP.

In the aberration diagrams, Fno is an F-number. In addition, M and S show a meridional image plane and a sagittal image plane, respectively, for the d-line. The chromatic aberration of magnification is shown by g-line, F-line, and C-line. In the aberration diagrams showing the chromatic aberration of magnification, the two-dot chain line shows the g-line, the one-dot chain line shows the C-line, and the remaining chain line shows the F-line. Y shows an image height.

In each embodiment, the first lens unit L1 does not move during focusing from an object at infinity to a close object. Therefore, the working distance does not vary during focusing. Thus, a macro lens having good operability can be provided.

In addition, the second lens unit is moved toward the image side and the fourth lens unit is moved toward the object side during focusing from an object at infinity to a close object. Thus, a floating method is used in which a plurality of lens units are moved during focusing. Therefore, the aberrations can be reliably corrected over the entire object distance range.

The fifth lens unit L5 includes a fifth-a lens unit L5a having a negative refractive power and a fifth-b lens unit L5b having a positive refractive power.

In each of the imaging lenses according to the embodiments of the present invention, the fifth-a lens unit L5a is moved in a direction having a component perpendicular to an optical axis so that the image position is shifted and the influence of hand movements can be reduced.

To provide good optical performance in both of a basic state in which the fifth-a lens unit L5a is not decentered and a vibration reducing state in which the fifth-a lens unit L5a is decentered to correct the image blur, the following condition is satisfied:

$$1.5 < f3/f < 3.0 \tag{1}$$

In the above expression, f3 is a focal length of the third lens unit L3 and f is a focal length of the entire system.

Conditional Expression (1) relates to the focal length of the third lens unit L3. The meaning of Conditional Expression (1) will now be described.

In general, in a vibration reducing state in which a lens unit included in an optical system is decentered, the following condition must be satisfied to completely correct the eccentric field curvature (refer to "Theory of Third-Order Aberrations of Optical Systems in Which Decentration Exists", Yoshiya Matsui, 1989, Japan Optomechatronics Association).

$$\alpha'_p \cdot P_q - \alpha_p(P_p + P_q) = 0 \tag{A}$$

In the above equation, $P_p$ is the Petzval sum of a vibration-reducing lens unit, $P_q$ is the Petzval sum of a lens unit disposed on the image side of the vibration-reducing lens unit, $\alpha_p$ is an angle of light rays incident on the vibration-reducing lens unit, and $\alpha_p'$ is an angle of light rays which exit the vibration-reducing lens unit.

To reduce the eccentric field curvature to 0, it is necessary that (I) $\alpha_p'$ is 0, that is, the light rays which exit the vibration-reducing lens unit are parallel to the optical axis (afocal); and (II) the Petzval sum of the lens unit disposed on the image side of the vibration-reducing lens unit is 0.

In a macro lens of an inner focus type, if the refractive powers are set such that Conditional Expression (A) is satisfied, the positive refractive power of the fourth lens unit L4 is reduced. As a result, the spherical aberration which occurs in the second lens unit in the positive direction cannot be sufficiently corrected in the negative direction. Therefore, it becomes difficult to reliably correct the spherical aberration. Accordingly, in the embodiments of the present invention, the positive refractive power of the third lens unit L3 is set to a suitable value so that the reduction in the positive refractive power of the fourth lens unit can be compensated for by the third lens unit. Thus, the spherical aberration can be adequately corrected over the entire object distance range.

If the refractive power of the third lens unit L3 is reduced such that the value of Conditional Expression (1) is greater than the upper limit thereof, it becomes difficult for the third lens unit to compensate for the reduction in the correction function of the fourth lens unit. As a result, the spherical aberration occurs in the positive direction. If the refractive power of the third lens unit L3 is increased such that the value of Conditional Expression (1) is less than the lower limit thereof, the spherical aberration occurs in the negative direction.

In addition, to reduce the absolute value of the sum of the Petzval sum of the fifth-a lens unit L5a, which functions as the vibration-reducing lens unit, and that of the fifth-b lens unit L5b, which is positioned on the image side of the fifth-a lens unit L5a, each of the imaging lenses according to the embodiments of the present invention satisfies the following condition:

$$0.35 < |f5a/f5b| < 0.60 \quad (2)$$

Conditional Expression (2) relates to the ratio between the refractive power of the fifth-a lens unit L5a and that of the fifth-b lens unit L5b. If the value of Conditional Expression (2) is greater than the upper limit thereof, it becomes difficult to correct the aberrations, in particular the field curvature, in the basic state. If the value of Conditional Expression (2) is less than the lower limit thereof, Conditional Expression (A) cannot be satisfied and it becomes difficult to correct the field curvature in the vibration reducing state.

In the present invention, the numerical ranges of Conditional Expressions (1) to (2) can be set as follows:

$$1.7 < f3/f < 2.8 \quad (1a)$$

$$0.40 < |f5a/f5b| < 0.50 \quad (2a)$$

According to the embodiments of the present invention, since the above-described conditions are satisfied, an imaging lens having a good optical performance is provided in which both the field curvature and the spherical aberration can be reliably corrected in both the basic state and the vibration reducing state. Further, the following condition can also be satisfied:

$$0.50 < f4/f < 0.70 \quad (3)$$

Conditional Expression (3) relates to the ratio between a focal length f4 of the fourth lens unit L4 and the focal length f of the entire system. If the refractive power of the fourth lens unit L4 is reduced such that the value of Conditional Expression (3) is greater than the upper limit thereof, it becomes difficult to correct the spherical aberration which occurs in the second lens unit L2 in the positive direction.

If the refractive power of the fourth lens unit L4 is increased such that the value of Conditional Expression (3) is less than the lower limit thereof, it becomes difficult to satisfy Conditional Expression (A) and the field curvature cannot be reliably corrected in the vibration reducing state.

The following condition can also be satisfied:

$$0.20 < f4/f3 < 0.30 \quad (4)$$

Conditional Expression (4) relates to the ratio between the focal length f4 of the fourth lens unit L4 and the focal length f3 of the third lens unit L3. If the refractive power of the third lens unit L3 is increased such that the value of Conditional Expression (4) is greater than the upper limit thereof, the spherical aberration occurs in the negative direction and it becomes difficult to correct the variation in the spherical aberration during focusing. If the refractive power of the third lens unit L3 is reduced such that the value of Conditional Expression (4) is less than the lower limit thereof, the spherical aberration in the positive direction which occurs due to the reduction in the refractive power of the fourth lens unit L4 cannot be compensated for by the third lens unit L3.

In each embodiment of the present invention, the fifth-a lens unit L5a is composed of a cemented lens including a negative lens and a positive lens. Therefore, even when the fifth-a lens unit L5a is moved in a direction having a component perpendicular to the optical axis to reduce the influence of hand movements, the state in which the chromatic aberration is reliably corrected can be maintained.

Since the fifth-a lens unit L5a is a small, light lens unit composed of a single cemented lens, it is not necessary to use a large driving unit for driving the fifth-a lens unit L5a.

In macro lenses, the effective F-number Fef generally varies in accordance with the imaging magnification β as follows:

$$Fef = (1-\beta) \cdot Fno$$

In the above equation, Fno is the F-number obtained when the object distance is infinity. According to the embodiments of the present invention, the sub-aperture stop SP2 is varied in accordance with the variation in the paraxial marginal ray, so that the stop diameter is reduced and unnecessary light is blocked.

The lens structure of the first embodiment of the present invention will now be described.

Referring to FIGS. 1A and 1B, the lens structure according to the first embodiment includes a first lens unit L1 having a positive refractive power, a second lens unit L2 having a negative refractive power, a third lens unit L3 having a positive refractive power and including an aperture stop SP and a sub-stop SP2, a fourth lens unit L4 having a positive refractive power, and a fifth lens unit L5 having a negative refractive power.

During focusing from an object at infinity to a close object, the first lens unit L1 does not move (stationary), the second lens unit L2 moves toward the image side, the third lens unit L3 does not move, the fourth lens unit L4 moves toward the object side, and the fifth lens unit L5 does not move.

Since the first lens unit L1 does not move during focusing, the overall length of the lens system (distance between the first lens surface and the image plane) is constant. Thus, an imaging lens having good operability is provided. In addition, since the floating method in which a plurality of lens units are moved during focusing is used, variations in aberrations during focusing can be reliably corrected.

The fifth lens unit L5 includes a fifth-a lens unit L5a having a negative refractive power which functions as the vibration reducing lens unit and a fifth-b lens unit L5b having a positive refractive power. The fifth-a lens unit L5a is composed of a cemented lens including a lens having a negative refractive power and a lens having a positive refractive power. The image blur caused by vibration is corrected by shifting the image position in a direction having a component perpendicular to the optical axis by moving the fifth-a lens unit L5a in a direction having a component perpendicular to the optical axis. IP denotes an image plane.

The fifth-a lens unit L5a is composed of a cemented lens including a positive lens having a convex surface on the image side and a biconcave negative lens in order from the object side to the image side. Therefore, even when the fifth-a lens unit L5a is moved in a direction having a component perpendicular to the optical axis to reduce the influence of hand movements, the state in which the chromatic aberration is reliably corrected can be maintained.

In addition, since the fifth-a lens unit L5a is a small, light lens unit composed of a single cemented lens, it is not necessary to use a large driving unit for driving the fifth-a lens unit L5a.

The lens structure of the second embodiment will now be described.

Referring to FIGS. 4A and 4B, the lens structure according to the second embodiment includes a first lens unit L1 having a positive refractive power, a second lens unit L2 having a negative refractive power, a third lens unit L3 having a positive refractive power, a fourth lens unit L4 having a positive refractive power, and a fifth lens unit L5 having a negative refractive power. The fifth lens unit L5 includes a fifth-a lens unit L5a having a negative refractive power which functions as the vibration reducing lens unit and a fifth-b lens unit L5b having a positive refractive power.

The fifth-a lens unit L5a is composed of a cemented lens including a lens having a negative refractive power and a lens having a positive refractive power. The image blur caused by vibration is corrected by moving the fifth-a lens unit L5a in a direction having a component perpendicular to the optical axis. SP denotes an aperture stop, SP2 denotes a sub-aperture stop SP2, and IP denotes an image plane.

During focusing from an object at infinity to a close object, the first lens unit L1 does not move, the second lens unit L2 moves toward the image side, the third lens unit L3 does not move, the fourth lens unit L4 moves toward the object side, and the fifth lens unit L5 does not move.

Since the first lens unit L1 does not move during focusing, the overall length of the lens system is constant. Thus, an imaging lens having good operability is provided. In addition, since the floating method in which a plurality of lens units are moved during focusing is used, variations in aberrations during focusing can be reliably corrected.

The structure of the optical system is similar to that of the first embodiment.

The lens structure of the third embodiment will now be described.

Referring to FIGS. 7A and 7B, the lens structure according to the third embodiment includes a first lens unit L1 having a positive refractive power, a second lens unit L2 having a negative refractive power, a third lens unit L3 having a positive refractive power and including an aperture stop SP and a sub-stop SP2, a fourth lens unit L4 having a positive refractive power, and a fifth lens unit L5 having a negative refractive power.

The fifth lens unit L5 includes a fifth-a lens unit L5a having a negative refractive power which functions as the vibration reducing lens unit and a fifth-b lens unit L5b having a positive refractive power.

The fifth-a lens unit L5a is composed of a cemented lens including a lens having a negative refractive power and a lens having a positive refractive power. The image blur caused by vibration is corrected by moving the fifth-a lens unit L5a in a direction having a component perpendicular to the optical axis. IP denotes an image plane.

During focusing from an object at infinity to a close object, the first lens unit L1 does not move, the second lens unit L2 moves toward the image side, the third lens unit L3 does not move, the fourth lens unit L4 moves toward the object side, and the fifth lens unit L5 does not move.

Since the first lens unit L1 does not move during focusing, the overall length of the lens system is constant. Thus, an imaging lens having good operability is provided. In addition, since the floating method in which a plurality of lens units are moved during focusing is used, variations in aberrations during focusing can be reliably corrected.

The structure of the optical system according to the third embodiment is similar to those of the first and second embodiments except the positive lens is disposed on the object side of the aperture stops SP and SP2 in the third lens unit L3.

First to third numerical examples corresponding to the first to third embodiments will now be described.

In each numerical example, r is the radius of curvature (unit: mm) of each surface and d is the distance (unit: mm) between the adjacent surfaces. In addition, nd is the refractive index with respect to the d-line, and vd is the Abbe number of each component with respect to the d line, which can be expressed as follows:

$$vd=(Nd-1)/(NF-NC)$$

Nd: Refractive index for d-line (wavelength 587.6 nm)

NF: Refractive index for F-line (wavelength 486.1 nm)

NC: Refractive index for C-line (wavelength 656.3 nm)

The relationship between Conditional Expressions (1) to (4) and the numerical examples is shown in Table 1 provided below.

FIRST NUMERICAL EXAMPLE

| Unit mm | | | | | |
|---|---|---|---|---|---|
| Surface Data | | | | | |
| Surface Number | r | d | nd | vd | Effective Diameter |
| 1 | 131.951 | 5.7 | 1.72916 | 54.7 | 46.2 |
| 2 | −125.378 | 0.15 | | | 45.57 |
| 3 | 44.495 | 5.2 | 1.72916 | 54.7 | 38.19 |
| 4 | 319.495 | 1.58 | | | 36.69 |
| 5 | −182.557 | 1.8 | 1.801 | 35 | 36.36 |
| 6 | 40.762 | 0.78 | | | 31.75 |
| 7 | 38.343 | 5.78 | 1.497 | 81.5 | 31.13 |
| 8 | −140.691 | (variable) | | | 29.82 |
| 9 | −248.519 | 1.4 | 1.72047 | 34.7 | 27.19 |
| 10 | 27.422 | 4.3 | | | 24.65 |
| 11 | −74.738 | 1.31 | 1.53172 | 48.8 | 24.71 |
| 12 | 29.897 | 4.4 | 1.84666 | 23.9 | 25.89 |
| 13 | 1984.002 | (variable) | | | 25.92 |
| 14 | ∞ | 2.14 | | | 26.83 |
| 15 (stop) | ∞ | 3.53 | | | 26.92 |
| 16 | −64.028 | 2.12 | 1.801 | 35 | 27 |
| 17 | −49.358 | (variable) | | | 27.35 |
| 18 | 124.805 | 3.85 | 1.618 | 63.4 | 28.21 |
| 19 | −69.793 | 0.48 | | | 28.55 |
| 20 | 62.29 | 5.28 | 1.72916 | 54.7 | 28.88 |
| 21 | −58.324 | 1.93 | 1.84666 | 23.9 | 28.62 |
| 22 | 177.251 | (variable) | | | 28.17 |
| 23 | −252.715 | 2.89 | 1.84666 | 23.9 | 28.05 |
| 24 | −68.669 | 1.44 | 1.71999 | 50.2 | 28.09 |
| 25 | 41.129 | (variable) | | | 28.03 |
| 26 | −57.78 | 2.41 | 1.6134 | 44.3 | 29.47 |
| 27 | −162.955 | 0.15 | | | 31.39 |
| 28 | 79.421 | 4.4 | 1.7432 | 49.3 | 33.48 |
| 29 | −134.415 | (variable) | | | 33.82 |
| image plane | ∞ | | | | |

-continued

Unit mm

| | | |
|---|---|---|
| Focal Length | | 100 |
| F-number | | 2.92 |
| Field Angle | | 12.21 |
| Image Height | | 21.64 |
| Overall Lens Length | | 162.90 |
| BF | | 48.35 |

| | ∞ | −0.5x | −1x |
|---|---|---|---|
| d8 | 1.31 | 9.90 | 20.32 |
| d13 | 21.73 | 13.14 | 2.71 |
| d17 | 18.54 | 9.21 | 1.91 |
| d22 | 3.00 | 12.33 | 19.63 |
| d25 | 6.97 | 6.97 | 6.97 |
| d29 | 48.35 | 48.35 | 48.35 |

SECOND NUMERICAL EXAMPLE

Unit mm

Surface Data

| Surface Number | r | d | nd | vd | Effective Diameter |
|---|---|---|---|---|---|
| 1 | 123.939 | 5.5 | 1.72916 | 54.7 | 46.21 |
| 2 | −129.916 | 0.15 | | | 45.68 |
| 3 | 45.121 | 5 | 1.72916 | 54.7 | 38.41 |
| 4 | 261.572 | 1.58 | | | 36.99 |
| 5 | −193.606 | 1.8 | 1.801 | 35 | 36.9 |
| 6 | 40.159 | 0.78 | | | 32.26 |
| 7 | 38.532 | 6 | 1.497 | 81.5 | 31.71 |
| 8 | −144.418 | (variable) | | | 30.37 |
| 9 | −309.953 | 1.4 | 1.72047 | 34.7 | 27.75 |
| 10 | 29.015 | 4.4 | | | 25.53 |
| 11 | −68.881 | 1.3 | 1.53172 | 48.8 | 25.57 |
| 12 | 32.727 | 4.39 | 1.84666 | 23.9 | 26.77 |
| 13 | −783.124 | (variable) | | | 26.81 |
| 14 | ∞ | 2.14 | | | 27.28 |
| 15 (stop) | ∞ | 3.66 | | | 27.33 |
| 16 | −58.005 | 2.2 | 1.834 | 37.2 | 27.37 |
| 17 | −47.059 | (variable) | | | 27.77 |
| 18 | 109.879 | 4 | 1.618 | 63.4 | 28.53 |
| 19 | −76.894 | 0.5 | | | 28.86 |
| 20 | 68.986 | 5.48 | 1.72916 | 54.7 | 29.13 |
| 21 | −63.781 | 2 | 1.84666 | 23.8 | 28.82 |
| 22 | 244.721 | (variable) | | | 28.42 |
| 23 | −255.687 | 3 | 1.84666 | 23.9 | 28.24 |
| 24 | −76.933 | 1.5 | 1.71999 | 50.2 | 28.25 |
| 25 | 38.715 | (variable) | | | 28.14 |
| 26 | −89.278 | 2.5 | 1.6398 | 34.5 | 29.4 |
| 27 | −170.526 | 0.15 | | | 30.85 |
| 28 | 52.375 | 4 | 1.7432 | 49.3 | 33.3 |
| 29 | 268.404 | (variable) | | | 33.42 |
| image plane | ∞ | | | | |

| | | |
|---|---|---|
| Focal Length | | 102.76 |
| F-number | | 2.92 |
| Field Angle | | 11.89 |
| Image Height | | 21.64 |
| Overall Lens Length | | 162.56 |
| BF | | 47.33 |

| | ∞ | −0.5x | −1x |
|---|---|---|---|
| d8 | 1.31 | 10.26 | 21.33 |
| d13 | 22.56 | 13.61 | 2.54 |
| d17 | 18.90 | 9.52 | 1.89 |
| d22 | 3.00 | 12.38 | 20.01 |
| d25 | 6.04 | 6.04 | 6.04 |
| d29 | 47.33 | 47.33 | 47.33 |

THIRD NUMERICAL EXAMPLE

Unit mm

Surface Data

| Surface Number | r | d | nd | vd | Effective Diameter |
|---|---|---|---|---|---|
| 1 | 114.942 | 5.89 | 1.72916 | 54.7 | 48.21 |
| 2 | −142.878 | 0.15 | | | 47.65 |
| 3 | 46.758 | 5.21 | 1.72916 | 54.7 | 40.09 |
| 4 | 230.168 | 2.57 | | | 38.5 |
| 5 | −148.763 | 1.8 | 1.801 | 35 | 37.21 |
| 6 | 42.577 | 0.73 | | | 32.75 |
| 7 | 39.606 | 6.31 | 1.497 | 81.5 | 32.2 |
| 8 | −104.794 | (variable) | | | 30.97 |
| 9 | −2039.621 | 1.4 | 1.72047 | 34.7 | 27.43 |
| 10 | 26.382 | 4.87 | | | 24.64 |
| 11 | −58.839 | 1.3 | 1.53172 | 48.8 | 24.71 |
| 12 | 31.229 | 4.4 | 1.84666 | 23.9 | 26.01 |
| 13 | −1411.125 | (variable) | | | 26.06 |
| 14 | −770.878 | 2.2 | 1.83481 | 42.7 | 27.07 |
| 15 | −150.612 | 1.5 | | | 27.14 |
| 16 | ∞ | 2.14 | | | 26.99 |
| 17 (stop) | ∞ | (variable) | | | 26.84 |
| 18 | 135.63 | 4 | 1.64 | 60.1 | 27.04 |
| 19 | −65.904 | 0.5 | | | 27.46 |
| 20 | 64.131 | 5.72 | 1.72916 | 54.7 | 27.78 |
| 21 | −59.208 | 2 | 1.84666 | 23.9 | 27.43 |
| 22 | 166.52 | (variable) | | | 27.04 |
| 23 | −250.206 | 2.9 | 1.84666 | 23.8 | 26.96 |
| 24 | −71.103 | 1.45 | 1.71999 | 50.2 | 27.02 |
| 25 | 39.068 | (variable) | | | 27.04 |
| 26 | −59.01 | 2.4 | 1.53172 | 48.8 | 30.1 |
| 27 | −109.061 | 0.15 | | | 31.91 |
| 28 | 88.965 | 4.2 | 1.7432 | 49.3 | 34.06 |
| 29 | −144.327 | (variable) | | | 34.39 |
| image plane | ∞ | | | | |

| | | |
|---|---|---|
| Focal Length | | 103 |
| F-number | | 2.92 |
| Field Angle | | 11.86 |
| Image Height | | 21.64 |
| Overall Lens Length | | 164.46 |
| BF | | 44.41 |

| | ∞ | −0.5x | −1x |
|---|---|---|---|
| d8 | 1.31 | 8.93 | 19.23 |
| d13 | 20.23 | 12.60 | 2.30 |
| d17 | 22.21 | 10.41 | 1.96 |
| d22 | 3.00 | 14.80 | 23.25 |
| d25 | 9.52 | 9.52 | 9.52 |
| d29 | 44.41 | 44.41 | 44.41 |

TABLE 1

| | 1st Numerical Example | 2nd Numerical Example | 3rd Numerical Example |
|---|---|---|---|
| Conditional Expression (1) | 2.53 | 1.95 | 2.17 |
| Conditional Expression (2) | 0.435 | 0.424 | 0.476 |
| Conditional Expression (3) | 0.522 | 0.547 | 0.504 |
| Conditional Expression (4) | 0.206 | 0.281 | 0.232 |

Figure 10:
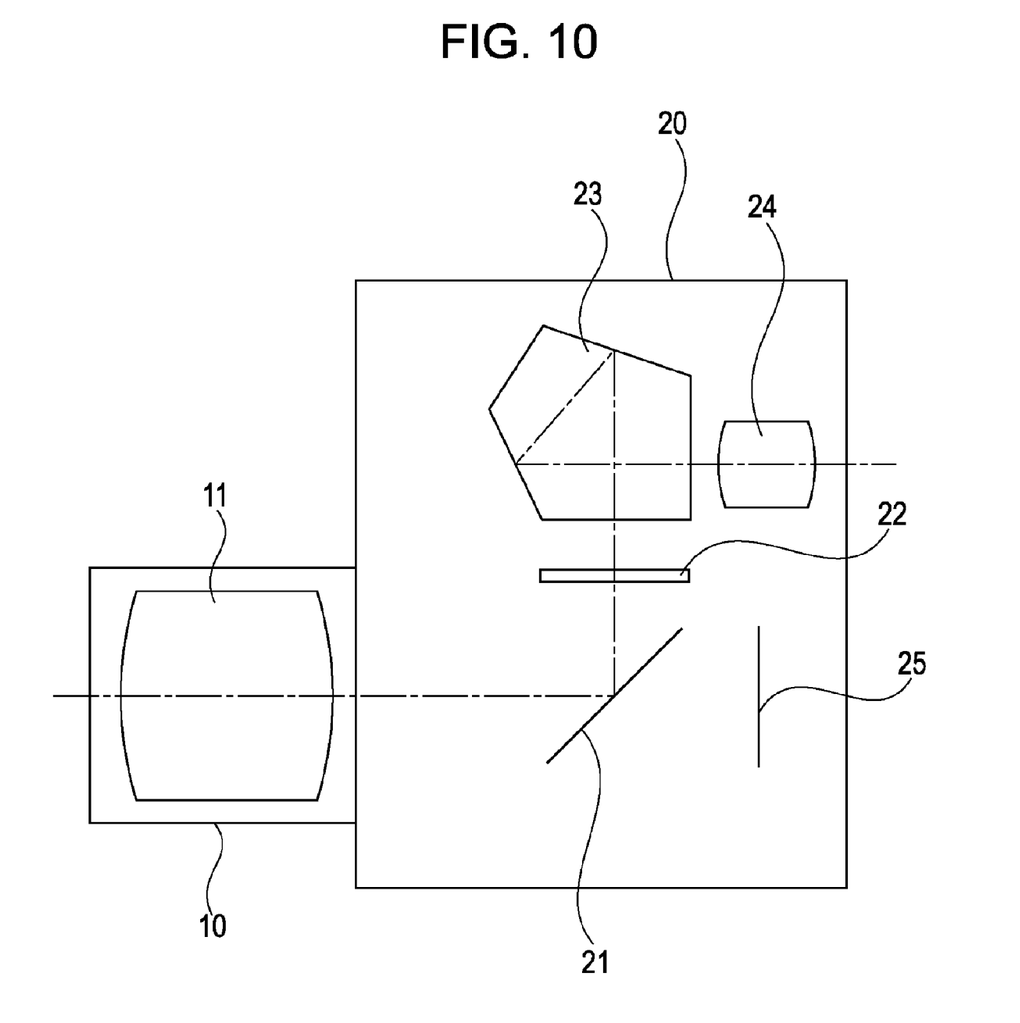
FIG. 10 is a schematic diagram illustrating the structure of a camera including an imaging lens according to any one of the first to third embodiments of the present invention.

FIG. 10 shows a camera (image pickup apparatus) including the imaging lens according to any one of the first to third embodiments. The camera includes a lens barrel 10 in which an imaging lens 11 according to any one of the first to third embodiments is disposed. The camera also includes a camera body 20 in which a mirror 21, a focusing screen 22, a penta-roof prism 23, an ocular lens 24, a solid-state image pickup element (photoelectric conversion element) 25, etc., are disposed. The mirror 21 reflects light rays obtained through the imaging lens 11 upward, and an object image is formed on the focusing screen 22 by the imaging lens 11. The penta-roof prism 23 converts the light rays from the focusing screen 22 into an erect image. The object image formed on the focusing screen 22 can be observed through the ocular lens 24. The solid-state image pickup element 25, such as a CCD sensor and a CMOS sensor, receives the light rays from the imaging lens 11.

FIG. 10 shows the camera in an observing state, that is, in an imaging standby state. When a user operates a release button, the mirror 21 is removed from an optical path shown in the figure, and the object image is received by the solid-state image pickup element 25. Thus, a camera capable of taking an image of a close object can be provided by using the imaging lens according to any one of the first to third embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-324167 filed Dec. 19, 2008, which is hereby incorporated by reference herein in its entirety.

What is claimed is:

1. An imaging lens, comprising:
a first lens unit having a positive refractive power;
a second lens unit having a negative refractive power;
a third lens unit having a positive refractive power;
a fourth lens unit having a positive refractive power; and
a fifth lens unit having a negative refractive power,
wherein the first lens unit, the second lens unit, the third lens unit, the fourth lens unit, and the fifth lens unit are arranged in order from the object side to the image side,
wherein, during focusing from an object at infinity to a close object, the first lens unit, the third lens unit, and the fifth lens unit do not move, the second lens unit moves toward the image side, and the fourth lens unit moves toward the object side,
wherein the fifth lens unit includes a fifth-a lens unit having a negative refractive power and a fifth-b lens unit having a positive refractive power in order from the object side to the image side, the fifth-a lens unit moving in a direction having a component perpendicular to an optical axis to shift a image position, and
wherein, when f3 is a focal length of the third lens unit, f is a focal length of the entire system of the imaging lens, f5a is a focal length of the fifth-a lens unit, and f5b is a focal length of the fifth-b lens unit, the following conditions are satisfied:

$1.5 < f3/f < 3.0$ $0.35 < |f5a/f5b| < 0.60.$

2. The imaging lens according to claim 1, wherein, when f4 is a focal length of the fourth lens unit and f is the focal length of the entire system of the imaging lens, the following condition is satisfied:

$0.50 < f4/f < 0.70.$

3. The imaging lens according to claim 1, wherein, when f4 is a focal length of the fourth lens unit and f3 is the focal length of the third lens unit, the following condition is satisfied:

$0.20 < f4/f3 < 0.30.$

4. The imaging lens according to claim 1, wherein the imaging lens forms an image on a solid-state image pickup element.

5. An image pickup apparatus, comprising:
the imaging lens according to claims 1; and
a solid-state image pickup element which receives an image formed by the imaging lens.

* * * * *